United States Patent
Weatherhead et al.

(10) Patent No.: US 7,680,550 B2
(45) Date of Patent: Mar. 16, 2010

(54) UNIT MODULE STATE PROCESSING ENHANCEMENTS

(75) Inventors: N. Andrew Weatherhead, Ayr (CA); Mark K. Carmount, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 149 days.

(21) Appl. No.: 11/864,678

(22) Filed: Sep. 28, 2007

(65) Prior Publication Data

US 2008/0097629 A1    Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
*G05B 11/01* (2006.01)
*G05B 13/02* (2006.01)
*G06F 11/30* (2006.01)
*G06C 17/00* (2006.01)
*G06F 15/16* (2006.01)

(52) U.S. Cl. ............... 700/27; 700/19; 700/28; 700/30; 700/31; 702/182; 702/183; 709/217; 709/218; 709/219

(58) Field of Classification Search ............ 700/18–19, 700/27–31, 86–87; 702/182–186; 709/217–219
See application file for complete search history.

(56) References Cited

U.S. PATENT DOCUMENTS

| | | | |
|---|---|---|---|
| 4,215,396 A | 7/1980 | Henry et al. | |
| 4,519,027 A | 5/1985 | Vogelsberg | |
| 4,570,217 A | 2/1986 | Allen et al. | |
| 4,910,691 A | 3/1990 | Skeirik | |
| 5,058,043 A | 10/1991 | Skeirik | |
| 5,068,778 A | 11/1991 | Kosem et al. | |
| 5,214,577 A | 5/1993 | Sztipanovits et al. | |
| 5,255,197 A | 10/1993 | Iida | |
| 5,262,954 A | 11/1993 | Fujino et al. | |
| 5,388,318 A | 2/1995 | Petta | |
| 5,420,977 A | 5/1995 | Sztipanovits et al. | |
| 5,450,346 A | 9/1995 | Krummen et al. | |
| 5,555,179 A | 9/1996 | Koyama et al. | |
| 5,673,194 A | 9/1997 | Cipelletti et al. | |
| 5,751,582 A | 5/1998 | Saxena et al. | |
| 5,920,717 A | 7/1999 | Noda | |

(Continued)

FOREIGN PATENT DOCUMENTS

EP    1770464    4/2007

(Continued)

OTHER PUBLICATIONS

OA mailed May 5, 2009 for U.S. Appl. No. 11/864,664, 21 pages.

(Continued)

*Primary Examiner*—Ramesh B Patel
(74) *Attorney, Agent, or Firm*—Turocy & Watson LLP; William R. Walbrun

(57) ABSTRACT

A system is provided to facilitate state processing in an industrial control environment. The system includes a unit module to process components in an industrial control facility. A status component associated with the unit module provides present state information for the components.

36 Claims, 11 Drawing Sheets

U.S. PATENT DOCUMENTS

| | | | |
|---|---|---|---|
| 5,946,212 | A | 8/1999 | Bermon et al. |
| 6,008,985 | A | 12/1999 | Lake et al. |
| 6,289,252 | B1 | 9/2001 | Wilson et al. |
| 6,397,114 | B1 * | 5/2002 | Eryurek et al. ............ 700/51 |
| 6,449,624 | B1 | 9/2002 | Hammack et al. |
| 6,459,944 | B1 | 10/2002 | Maturana et al. |
| 6,501,995 | B1 | 12/2002 | Kinney et al. |
| 6,527,018 | B2 | 3/2003 | Yamauchi et al. |
| 6,662,061 | B1 | 12/2003 | Brown |
| 6,675,324 | B2 | 1/2004 | Marisetty et al. |
| 6,760,630 | B2 | 7/2004 | Turnaus et al. |
| 6,832,118 | B1 | 12/2004 | Heberlein et al. |
| 6,859,755 | B2 | 2/2005 | Eryurek et al. |
| 6,865,432 | B2 | 3/2005 | Brown |
| 6,996,741 | B1 | 2/2006 | Pittelkow et al. |
| 7,058,712 | B1 | 6/2006 | Vasko et al. |
| 7,089,155 | B2 | 8/2006 | Hegel |
| 7,089,530 | B1 | 8/2006 | Dardinski et al. |
| 7,117,504 | B2 | 10/2006 | Smith et al. |
| 7,123,978 | B2 | 10/2006 | Hartman et al. |
| 7,149,595 | B2 | 12/2006 | D'Mura |
| 7,162,534 | B2 | 1/2007 | Schleiss et al. |
| 7,249,356 | B1 | 7/2007 | Wilson et al. |
| 7,254,457 | B1 | 8/2007 | Chen et al. |
| 7,289,861 | B2 * | 10/2007 | Aneweer et al. ............ 700/110 |
| 7,307,986 | B2 | 12/2007 | Henderson et al. |
| 7,313,453 | B2 | 12/2007 | Kline |
| 7,415,708 | B2 * | 8/2008 | Knauerhase et al. ........... 718/1 |
| 7,424,331 | B2 | 9/2008 | Patel |
| 2001/0049562 | A1 * | 12/2001 | Takano et al. ............ 700/19 |
| 2002/0010908 | A1 | 1/2002 | Cheng et al. |
| 2002/0042896 | A1 * | 4/2002 | Johnson et al. ............ 714/47 |
| 2003/0051071 | A1 | 3/2003 | Stefansson et al. |
| 2003/0177018 | A1 | 9/2003 | Hughes |
| 2004/0095833 | A1 | 5/2004 | Marisetty et al. |
| 2004/0158713 | A1 * | 8/2004 | Aneweer et al. ............ 713/166 |
| 2004/0172612 | A1 | 9/2004 | Kasravi et al. |
| 2004/0181294 | A1 | 9/2004 | Deitz et al. |
| 2004/0243260 | A1 | 12/2004 | Law et al. |
| 2005/0015769 | A1 * | 1/2005 | Gegner ............ 718/104 |
| 2005/0227217 | A1 | 10/2005 | Wilson |
| 2006/0101433 | A1 | 5/2006 | Opem et al. |
| 2006/0230383 | A1 | 10/2006 | Moulckers et al. |
| 2006/0265688 | A1 | 11/2006 | Carlson et al. |
| 2007/0089100 | A1 | 4/2007 | Morris et al. |
| 2007/0100486 | A1 * | 5/2007 | Burda et al. ............ 700/100 |
| 2007/0101193 | A1 | 5/2007 | Johnson et al. |
| 2007/0162268 | A1 | 7/2007 | Kota et al. |
| 2007/0186090 | A1 | 8/2007 | Yu et al. |
| 2007/0261027 | A1 | 11/2007 | Dhanakshirur et al. |
| 2007/0269297 | A1 | 11/2007 | Meulen et al. |
| 2008/0120129 | A1 | 5/2008 | Seubert et al. |
| 2008/0126407 | A1 | 5/2008 | Shimaoka et al. |
| 2008/0188960 | A1 * | 8/2008 | Nixon et al. ............ 700/86 |

OTHER PUBLICATIONS

OA mailed May 13, 2009 for U.S. Appl. No. 11/864,733, 23 pages.
OA mailed May 12, 2009 for U.S. Appl. No. 11/856,563, 30 pages.

* cited by examiner

UNIT MODULE STATE PROCESSING ENHANCEMENTS

CROSS REFERENCE TO RELATED APPLICATION

This application claims the benefit of U.S. Provisional Patent Application No. 60/862,403 entitled MODULE CONTROL AND STATE PROPAGATION, and filed on Oct. 20, 2006, the entirety of which is incorporated herein by reference. This application also claims the benefit of U.S. Provisional Patent Application No. 60/890,973 entitled MODULE CONTROL AND STATE PROPAGATION, and filed on Feb. 21, 2007, the entirety of which is incorporated herein by reference.

TECHNICAL FIELD

The claimed subject matter relates generally to industrial control systems and more particularly to modules that are adapted to determine and process present state information from a unit which represents a vessel or machine.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application). Although S88 was developed to describe batch processes, it has broad applicability to discrete and continuous processes.

S88 standard defines models of equipment and procedures for use in automated batch processes, as well as terminology for use in referring to those models and their elements. The S88 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, one of the intents of the standard is to provide a broad, standardized model for describing the procedures followed in automated control, which may include batch, continuous and discrete.

Prior systems that employed standard models such as S88 and the like often generated code to determine available states in a process. For example, one module may need to know that a vessel is empty or clean before adding new materials to the vessel. This generally required the designer to write code to determine the desired state and often the state was inferred from a previous process. Inferred states have the additional disadvantage of not providing certainty regarding the actual state of a component. For example, it may be inferred that a vessel was clean from a command generated to clean the vessel, yet actual knowledge of the vessel's cleanliness or state is not directly known.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

State evaluation and determination components are provided with functional modules such as a Unit Module. The state evaluation provides present state conditions as opposed to inferred status. By adding such capability to the module, code design during installation is mitigated. In one example, a Unit Module provides resident control for a Unit (e.g., vessel, tank and so forth) where processing activities can be performed. The Unit Module can include advanced functionality for reliable equipment control that includes the ability to generate and process present state information such as quality, availability, cleanliness and so forth. In addition, a parent child relationship can be created with other subordinate equipment centric objects (Control Modules, Equipment Modules), which provides increased communications functionality to the subordinate modules.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Unit module state enhancements are provided to facilitate automated manufacturing operations and software design. In one aspect, a system is provided to facilitate state processing in an industrial control environment. The system includes a unit module to process components in an industrial control facility. A status component associated with the unit module provides present state information for the components. The present state information can be associated with unit availability, unit cleanliness, unit process, unit quality, a batch campaign status, or an equipment performance status, for example.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
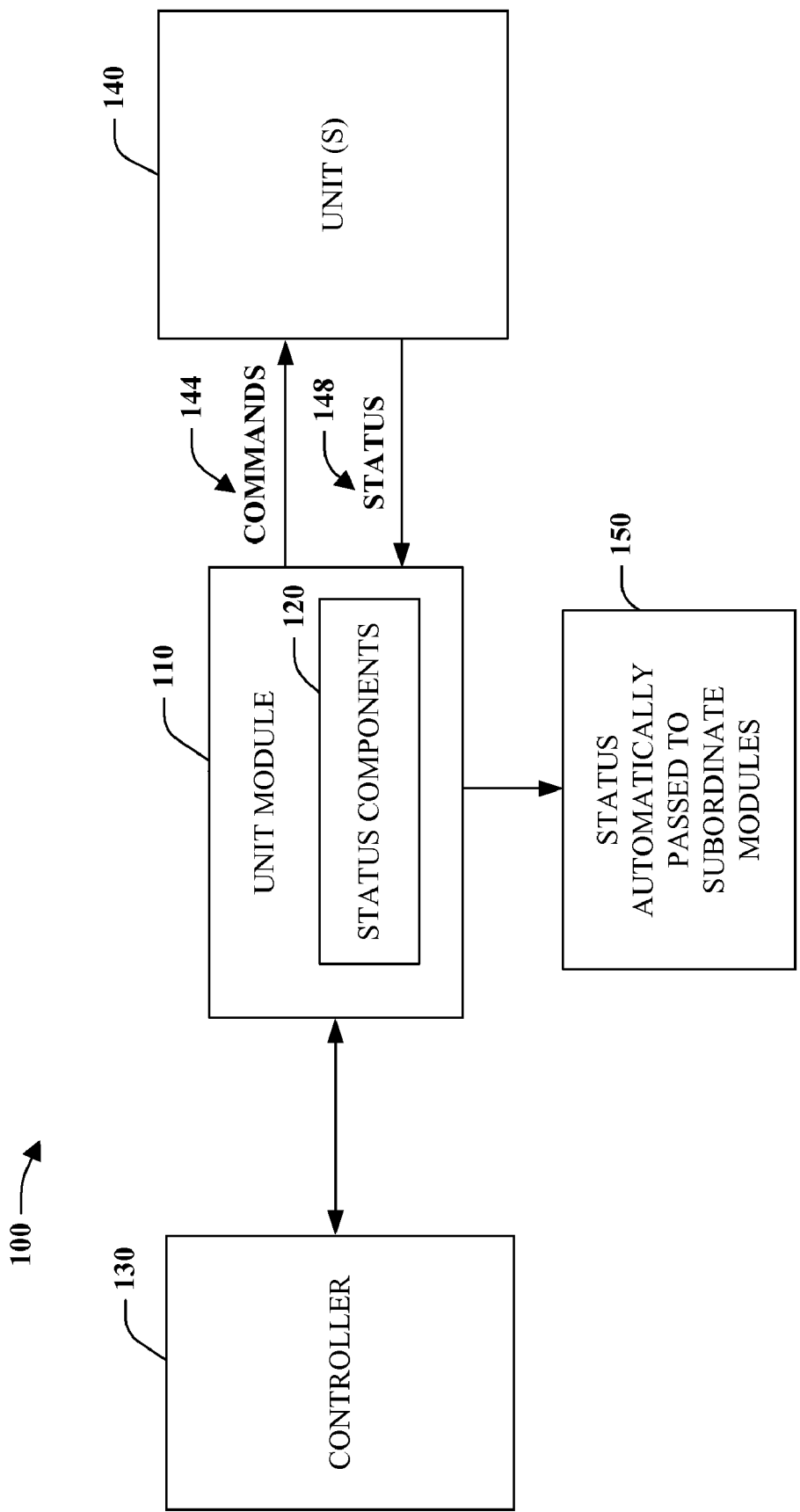
FIG. 1 is a schematic block diagram illustrating a unit module and status components for an industrial automation system.

Referring initially to FIG. 1, a system 100 illustrates a unit module 110 and status components 120 for an industrial automation environment. A controller 130 such as a batch server or programmable controller operates (or communicates with) the unit module 110, where one or more units 140 respond to commands 144 and provide present status to the unit module. In contrast to prior systems, the status components 120 in the unit module 110 receive and process the status 148 according to the current conditions of the unit 140 as opposed to inferred or other type conditions. For instance, the unit 140 could be a vessel that is cleaned before a next phase of a batch is initiated. Cleanliness is a state that can be captured by the status components 120 to indicate to the unit module 110 that the unit 140 is in fact clean at the present time. As shown, status can be automatically passed to subordinate modules 150. As can be appreciated, a hierarchy of modules can be communicated with via the unit module 110 as will be described in more detail below with respect to FIG. 3. Thus, along with subordinate modules 150 being apprised of present status, modules above the unit module in a hierarchy (not shown) can also receive the respective status.

State evaluation components 120 are provided with functional control modules such as the unit module 110 but other modules can also receive and process such status 148. The state evaluation provides present state conditions as opposed to inferred status. By adding such capability to the unit module 110 (or other module), code design during installation is mitigated since code does not have to be developed to determine or infer the correct status. In one example, the unit module 110 provides resident control for the unit 140 where processing activities (e.g., mix a batch, perform discrete operation) can be performed. The unit 140 can include vessels, tanks, work areas, or assembly points where a process is performed or discrete operation commences. The unit module 110 can include advanced functionality for reliable equipment control that includes the ability to generate and process present state information such as quality, availability, cleanliness and so forth which will be described in more detail below. In addition, a parent child relationship can be created with other subordinate equipment centric objects or modules at 150 (Control Modules, Equipment Modules), which provides increased communications functionality to the subordinate modules.

Before proceeding, some example features of the unit module 110 and status components 150 are now described. In one aspect, the unit module 110 provides Availability Status which can include such states as: Available; Producing; Held; Out of Service; and so forth. The unit module 110 is also capable of accepting requests from users and external logic to change the availability status. In another aspect, Cleanliness Status can include such status as: Not Clean; Rinsed; Cleaned; Sanitized, and so forth. This also includes the ability of accepting requests from users and external logic to change the cleanliness status. In other examples, the unit module 110 provides process status such as Empty; Filling; Processing; Emptying; and so forth. The unit module 110 can also provide status information to other modules in a hierarchy of modules as noted above. This status information can be persistent and include: Alarm status; Availability Status; Cleanliness Status; Process Status; Quality Status; Campaign Status; or other status as desired.

In yet another aspect, a unit module control system is provided. The system includes means for controlling a unit module (controller 130) and means for generating status for the unit module (unit 140). This can also include means for analyzing the status (status components 120) within the unit module 110 where the status is employed to determine present conditions of at least one unit.

As will be described in more detail below, the unit module 110 can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A control module that manages a material may be referred to as a Material control module and so forth.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
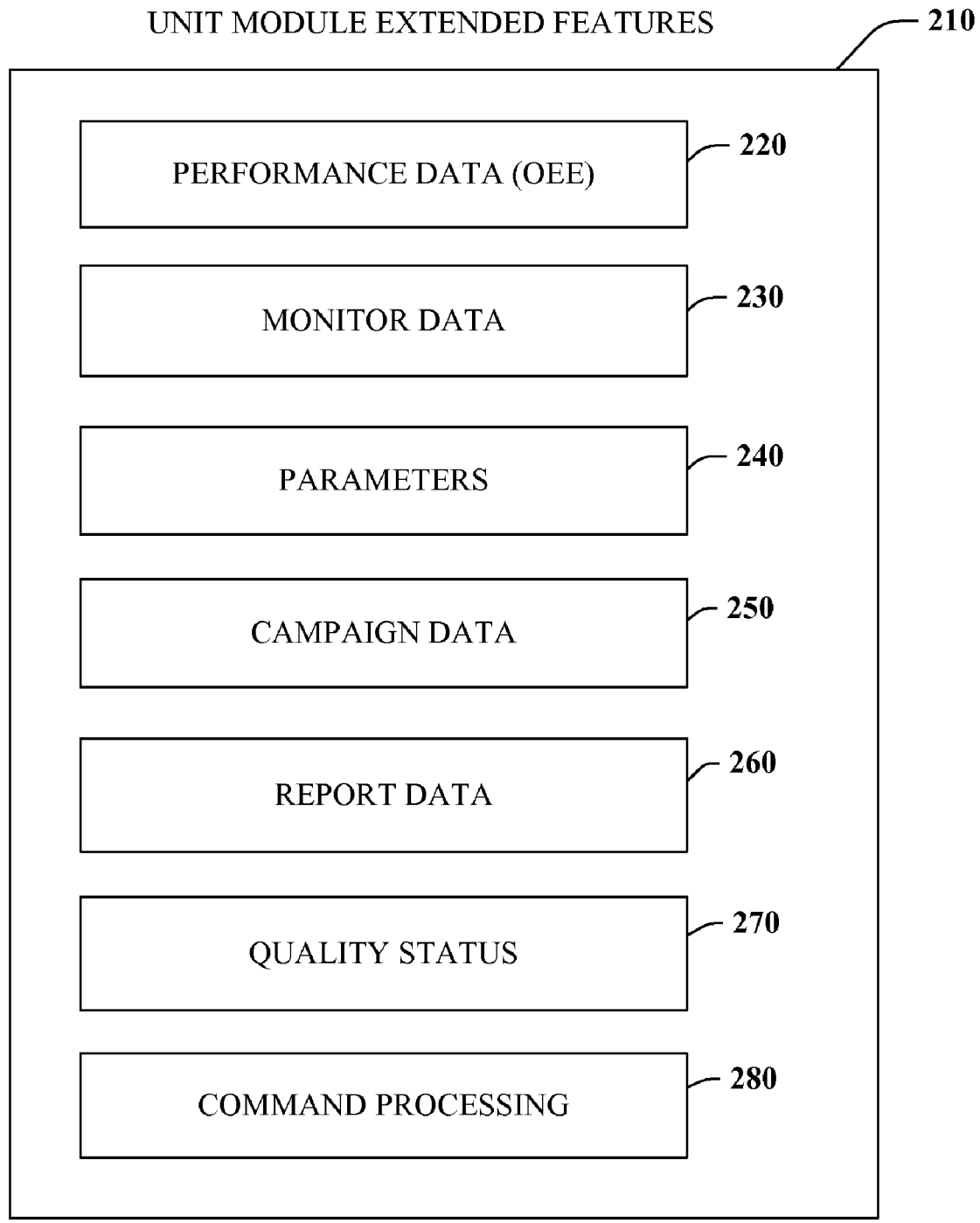
FIG. 2 is a block diagram illustrating example unit module extended features or functionality.

Referring now to FIG. 2, unit module extended features or functionality 210 is illustrated. In one aspect, the extended module features 210 include processing, determining, and/or communicating performance data 220. This can include OEE, Overall Equipment Efficiency, data which is a formula to yield the overall performance of equipment (or a factory), governed by the cumulative impact of factors such as, the equipment's availability (percent of scheduled production time available), performance rate (percent of parts produced compared to standard) and quality (percent of sellable parts produced compared to parts started). Example process performance data 220 can include:
  Last Batch Cycle Time
  Average Batch Cycle Time
  Time Held
  Time Standby
  Number of Times Held Current Batch
  Number of Times Aborted Current Batch
  Number of Faults Current Batch (all subordinate equipment)
  Number of Faults Last Batch (all subordinate equipment)

Example discrete performance data 220 can include:
  Total parts produced
  Expect parts produce
  Total Good Parts, Total Bad Parts, Line Cycle Time, or Line down time, for example.

Proceeding to 230, the extended module features 210 can include monitor data. Generally, the module can monitor the current batch cycle time, and compare to a configured batch cycle time limit. The module can provide an indication when the batch cycle time is exceeded, for example. This capability can be enabled/disabled through a configuration parameter. At 240, the module provides the ability for campaign batching which includes a configuration parameter to enable/disable campaign batching. At 250, the module receives (from an operator, or external Logic), stores, and may provide campaign data, examples of campaign data are:
  Campaign Count Preset
  Campaign Count Actual
  Last Batch
  First Batch This may also include processing batch cleanliness requirements, and establishing and providing an indication that the cleanliness requirements have been met. At 260, the module is capable of receiving, storing and making available the following batch data examples of batch data are:
  Product Name
  Product ID
  Recipe ID
  Destination
  Manufacturers Order Number At 260, Quality Status may be provided, examples of quality status are:
  Testing
  Released
  Held
  Failed
  Test Batch At 280, other types of command processing can be provided. The module can accept requests from users, or external logic to hold the emptying of the unit. The module can provide such status to external logic, if desired. The module can also provide the ability to maintain a set amount of material at the end of the batch cycle for use in starting the next batch cycle and display, via a human machine interface (HMI), the current amount of material. The operator or external logic can modify the amount to be maintained. As can be appreciated, other types of commands, status, or parameters can be provided.

Figure 3:
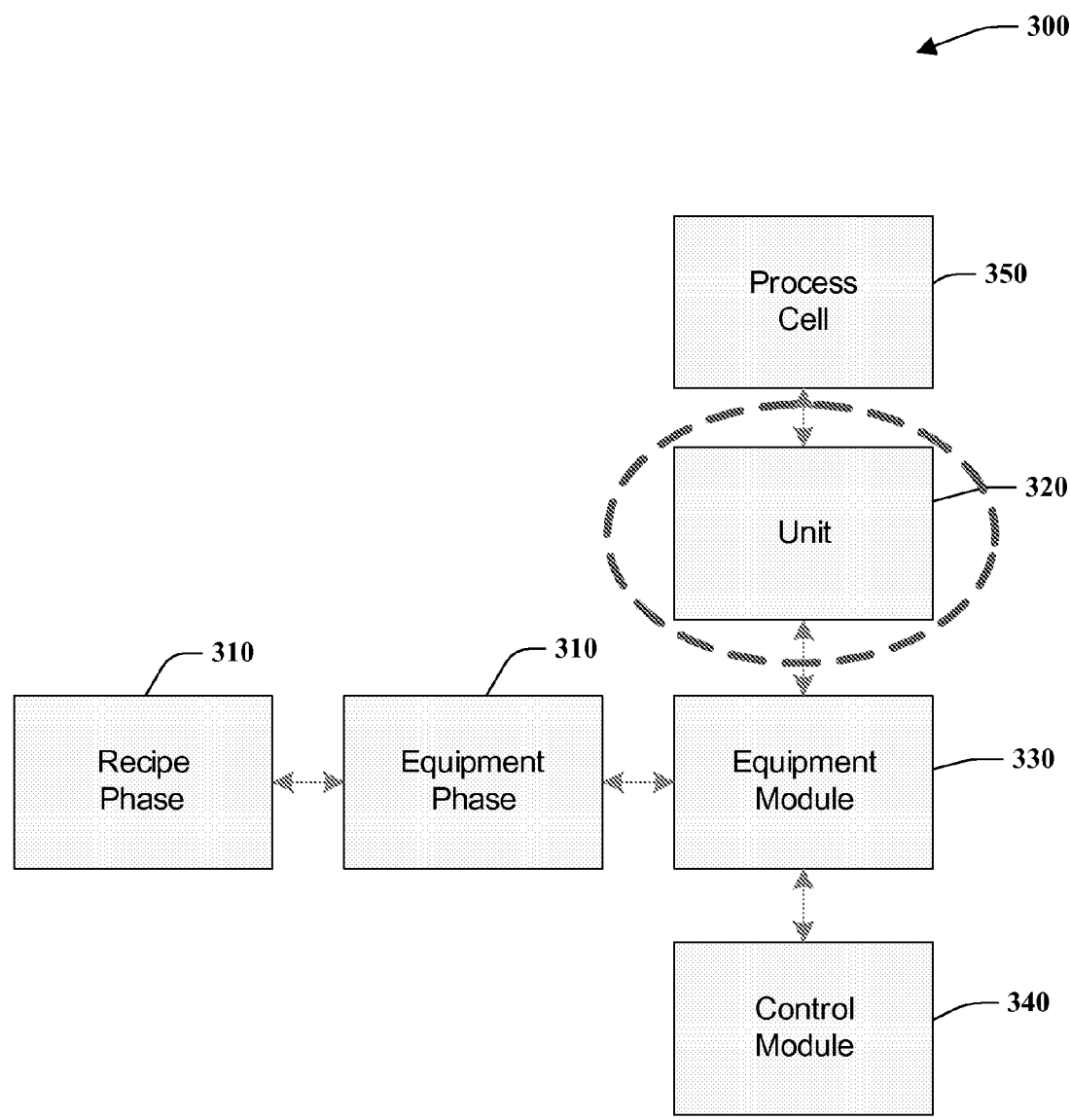
FIG. 3 illustrates how a unit module is operative in an example hierarchy of modules.

Turning to FIG. 3, an example system 300 illustrates how a unit module is operative in an example hierarchy of modules. As shown, a unit 320 (or unit module) can operate in a hierarchy of modules. In one example, the unit 320 interacts with a process cell 350 with subordinate modules—an equipment module 330 and a control module 340. A recipe phase 310 and an equipment phase 310 can be provided to drive the equipment module 330. As can be appreciated, other configurations of modules and/or other components can be provided than shown in the example system 300.

In one aspect, the unit 320 can be defined as follows: Unit: A collection of associated control modules and/or equipment modules and other process equipment in which one or more major processing activities can be conducted. Generally, Units are presumed to operate on one batch at a time and operate relatively independently of one another. This term typically applies to both the physical equipment and the equipment entity. Examples of processing activities are react, crystallize, and create a solution. As illustrated in the system 300, software can be constructed in a series of layers. These software layers can also be referred to as a hierarchy. Building a hierarchy within the software allows designers to better manage complex systems and to reuse portions of software from one project to another.

Figure 4:
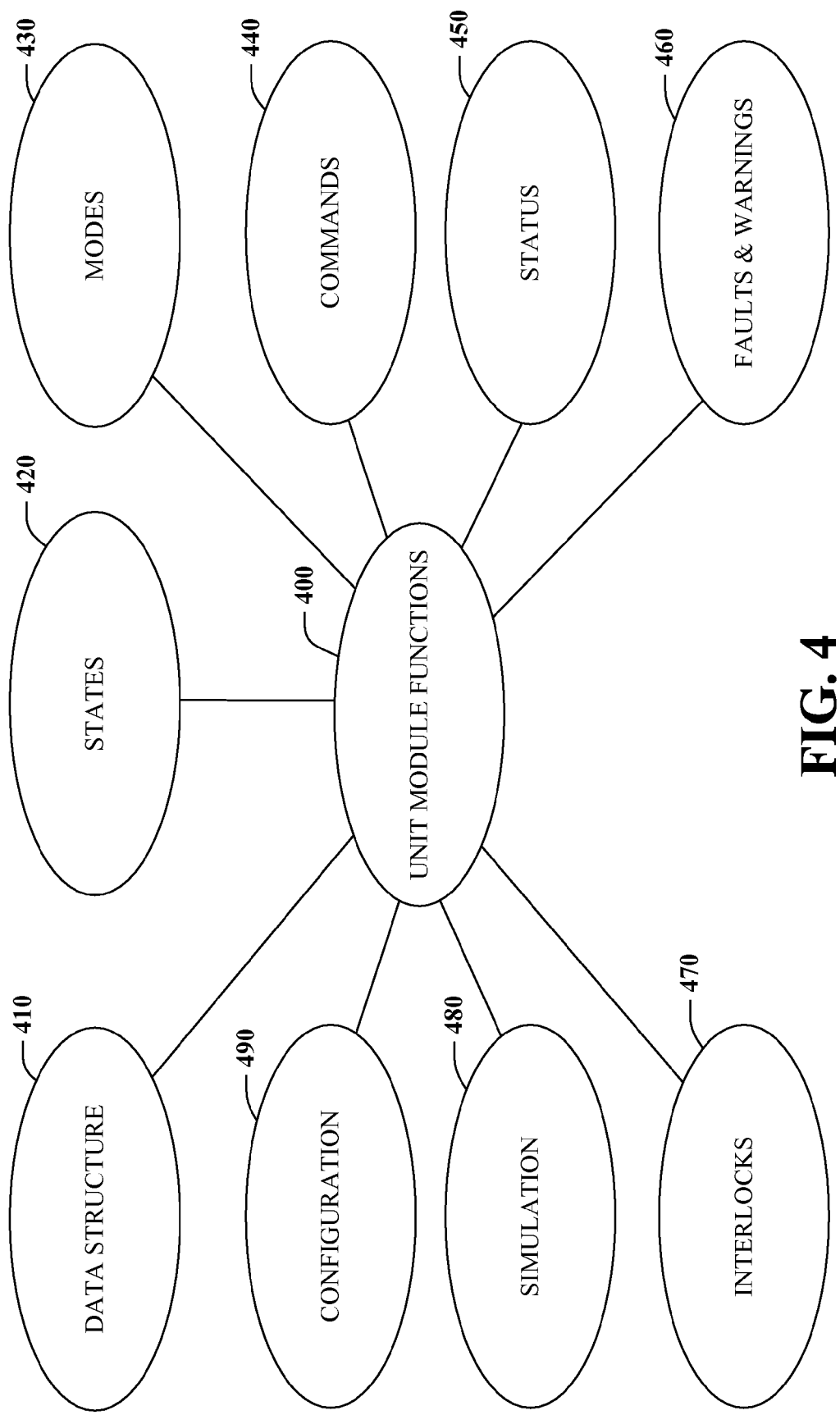
FIG. 4 illustrates example module functions.

Referring now to FIG. 4, example unit module functions 400 are illustrated. At 410, a module Data Structure can be provided. The unit module can be structured in a manner that allow an individual to easily find and understand information issued to and produced by the respective module. For example, commands can be grouped in a common section, status is given in a separate section, and configuration parameters are grouped together as well. Another unit module function 410 includes state processing 420. Thus, the unit module can perform as a state machine for a particular grouping of equipment modules. The actual states can be defined during implementation. The states 420 may be initiated by a procedure or operator, but the unit states do not have to follow the S88 state model although S88 states can be employed. An example state processing diagram is illustrated and described with respect to FIG. 5 below.

At 430, mode processing can be provided. Generally, the unit module functions via the control system in auto, semi-auto or manual mode. While in auto mode, the respective unit is under the control of the automation system. All direct control requests from the operator will generally be ignored. While in semi-auto mode, the unit may receive requests from an operator at the equipment phase or the equipment module level, for example. While in manual mode the unit may receive requests from an operator at the control module level, for example. Proceeding to 440, one or more commands can be provided. Typically, the unit module is commanded to a state or mode by automation commands or the operator. The unit module has the ability to transfer these states or modes to its associated Equipment Phases and Modules.

At 450, module status can be processed. As noted above, the unit module provides a set of predefined status values. A project specific area can also be created to allow the user to add additional status information. This status describes the unit, which may be a vessel or machine. Status information can be grouped into the following example categories: Alarm; Availability; Cleanliness; Process; Quality; Campaign; and so forth. At 460, fault and warning data can be provided by the unit module. For instance, the unit module can monitor fault conditions and generate suitable fault status when a failure occurs. At 470, interlocks can be provided. If the process or safety interlocks are lost, the unit module can be de-energized. A process interlock bypass configuration can be provided to circumvent process interlocks for a device. At 480, the unit module can be placed in a simulation mode. Simulation can also be achieved indirectly within subordinate Control Modules. At 490, configuration includes modifying a unit module's configuration data, where the behavior of a particular module instance can be modified. When module configurations are considered valid, an individual of appropriate authorization level may save the current settings. If the unit module's configuration settings deviate from the saved setting, an indication can appear on the HMI faceplate or electronic message for example. An authorized individual can then save the current configurations or restore the previously saved configuration. In providing configurable attributes, a single Unit module class may be adapted to a number of diverse vessel or machine instances.

Figure 5:
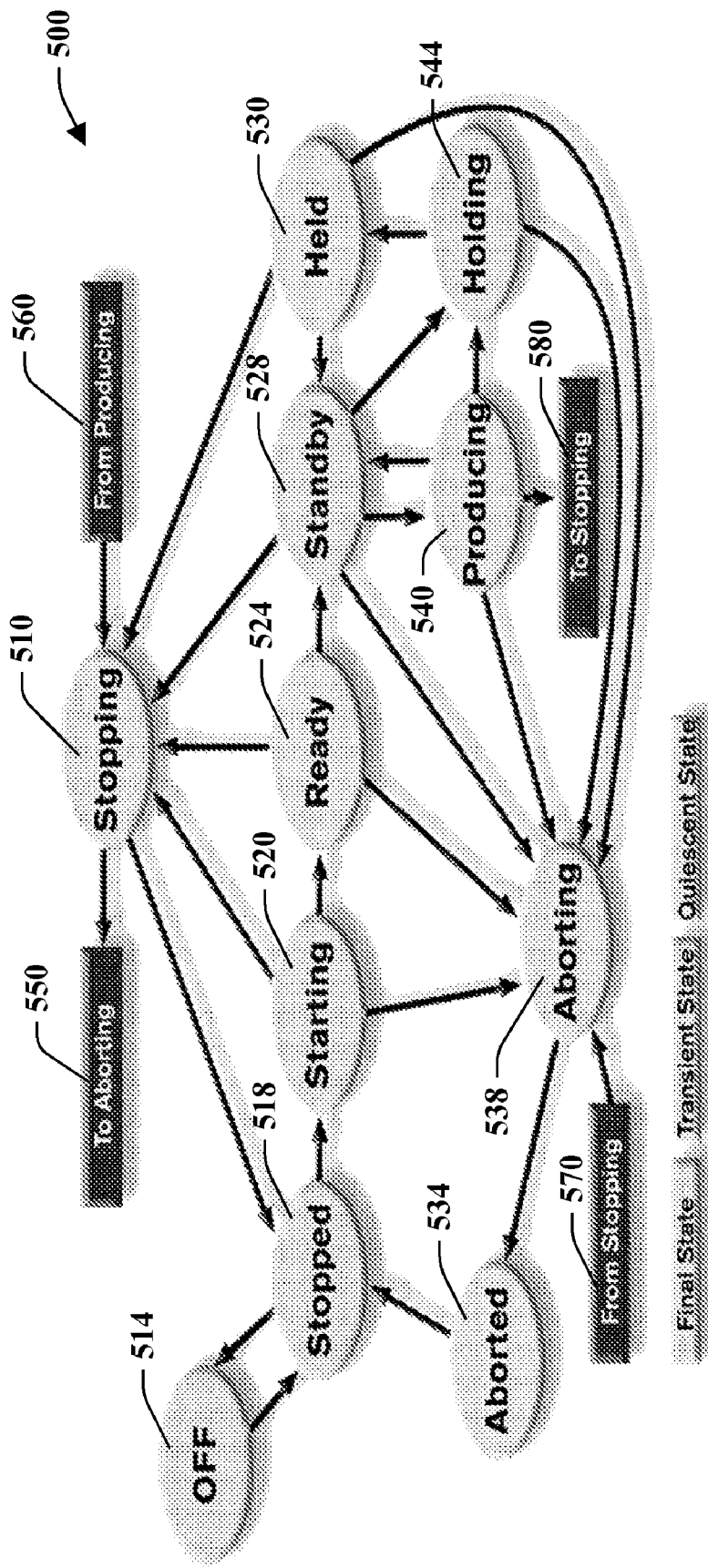
FIG. 5 illustrates an example module state machine.

Turning to FIG. 5, an example state machine processing diagram 500 is illustrated for a unit module. As shown, example states can include stopping 510, off 514, stopped 518, starting 520, ready 524, standby 528, and held 530. Other example states include aborted 534, aborting 538, producing 540, and holding 544. Ingress and Egress to the state diagram 500 can occur from other states such as to aborting 560, from producing 560, from stopping 570, and to stopping 580. Typically, unit module states are processed within a unit core module, based on state of the process and the requests from the procedure and/or operator. Various state models can be employed such that are also compatible with S88 standards but rigid conformance to the standard is not a requirement.

In one example, a state model can be based on a packaging machine's state, where such states can be applied to the unit. In one aspect, a Unit and a Machine can be considered synonymous. The unit core module can also utilize a subset of the states shown in the diagram 500. As can be appreciated, more states than shown in the diagram 500 or a completely independent state model can also be controlled and utilized.

Figure 6:
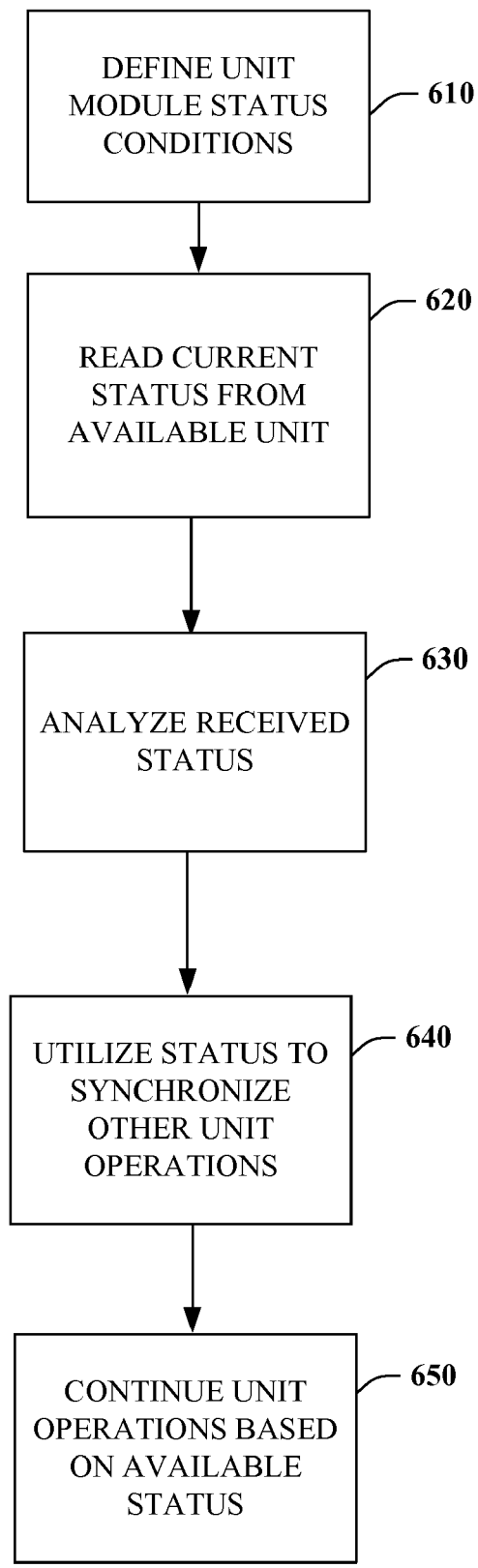
FIG. 6 is a flow diagram illustrating a module status processing methodology.

FIG. 6 illustrates a module status processing methodology 600 for an industrial automation system. While, for purposes of simplicity of explanation, the methodology is shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 610 of FIG. 6, various types of unit module status is defined. As noted previously, such status can include present state information such as unit availability, unit cleanliness, unit process conditions, unit quality status, batch campaign status, or an equipment performance status, for example. As can be appreciated, other types of status can also be defined. At 620, current status is read from an available unit by status components associated with a respective unit module. For example, cleanliness status may be read where it is determined that a vessel for mixing ingredients has been cleaned or other conditions of the cleanliness (e.g., washed but not rinsed, rinsed but not dry, and so forth). At 630, the present status is analyzed by a respective unit module and/or controller. The status read generally enables further operations on a unit to commence. Thus, without writing additional code to infer the status of the unit, present status read can be employed to synchronize other operations in a recipe or discrete operation as shown at 640. For example, if a vessel needed to be cleaned, cleaning operations can be commenced and determined at 630 before the vessel could be utilized at 640. At 650, further unit operations are continued based on the available status. Although not shown, the process 600 could provide monitoring paths where status is monitored during various or regular intervals of one or more process operations.

Figure 7:
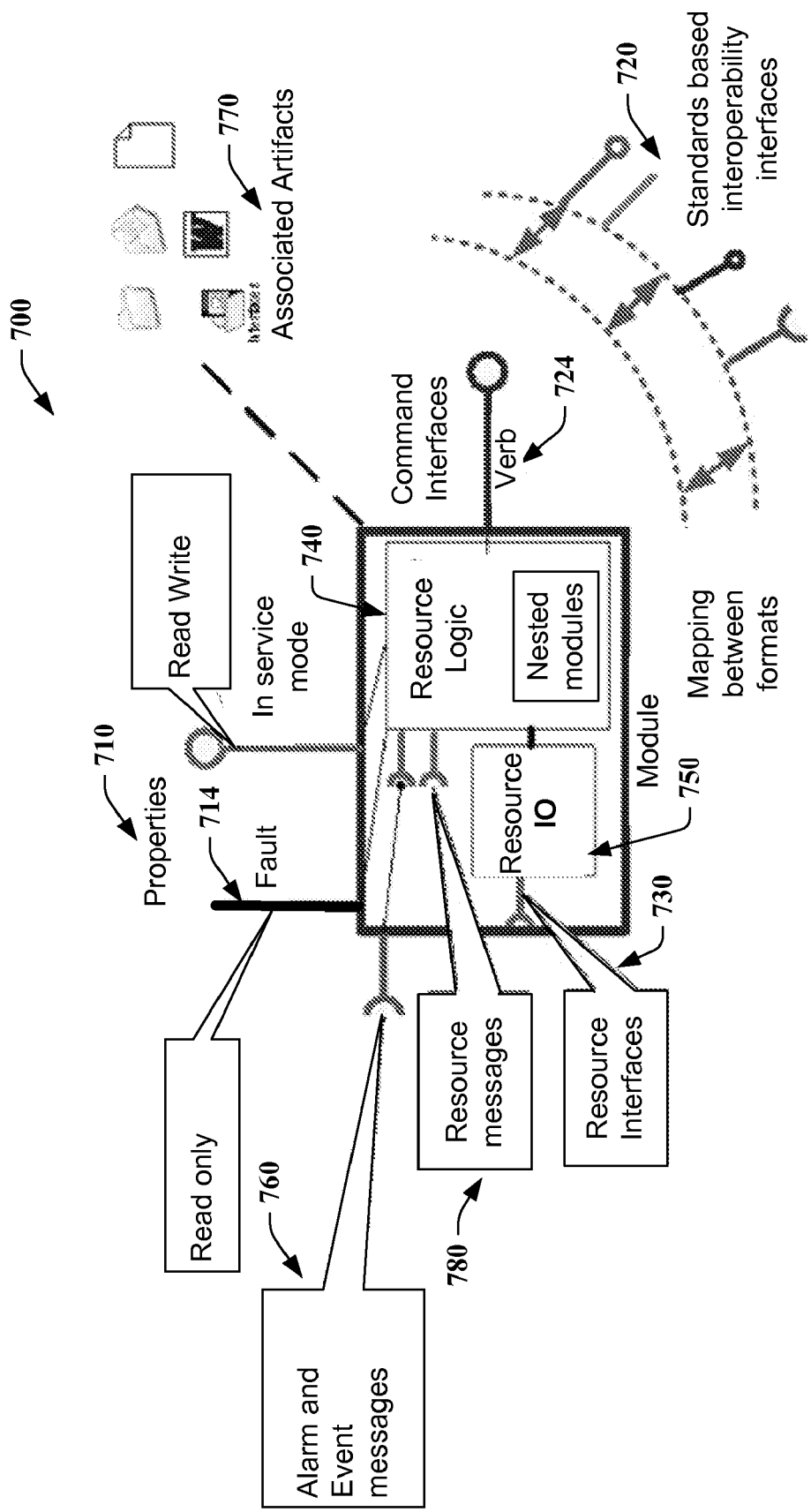
FIG. 7 is a diagram illustrating module attributes.

Referring now to FIG. 7, module attributes 700 are illustrated. The attributes 700 depicted in FIG. 7 include a common (or exemplary) representation that can be modules built from other modules. Generally, a set of standard attributes can be determined that are common to all modules. Similarly, for other types of modules described below, additional standard attributes can be defined. An example of a property 710 available on modules includes attributes such as Fault and Status at 714. Active resource modules (e.g., equipment and personnel) can support additional properties 710 such as available/unavailable.

Attributes presented below are represented associations from the module to objects which may be internal in a common data model or elsewhere (e.g., CAD Files). At 720, standard public interfaces can be provided. These interfaces 720 publish verbs 724 that are available to external systems and are documented activities that hide the complexity of the underlying code used to implement the interface. Interfaces 720 can be considered into at least two common usage scenarios. For example, interfaces 720 can be used as access points that can be used to hook in real time diagnostics, security and so forth.

Public verbs 724 initiate an action within the module. The activity is described to clients of the interface 720. The implementation is considered private and is not presented to clients—for example, Open, Stop, Abort, Shut, and so forth. A data value property 710 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 710 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 720. e.g., Conversion Map, Name, Description, expiry date, personnel contact information. Some properties 710 can be common to all instances of resource modules (e.g., scanned copy of resource specification documents), whereas other properties 710 are specific to each module instance (e.g., Status, percent open).

At 730, internal resource interfaces include interfaces from logic 740 in the module to the resource being managed at 750, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 730 are internal to the module enabling the modules public interfaces 720 and properties 710 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 720 to runtime systems may then consider these interfaces as internal.

At 760, alarm and event messages can be provided which include messages that exposed as runtime messages visible to external systems during the execution of the module. This includes alarms and events explicitly coded by the developer and system messages promoted to be visible by external systems. At 770, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 780, system messages allow modules to listen for and publish data model messages to external components. Inbound messages are typically used to manage modules (configure, initialize, propagate properties, and so forth) and publish messages on module activity (resource state, data model messages, and so forth).

Figure 8:
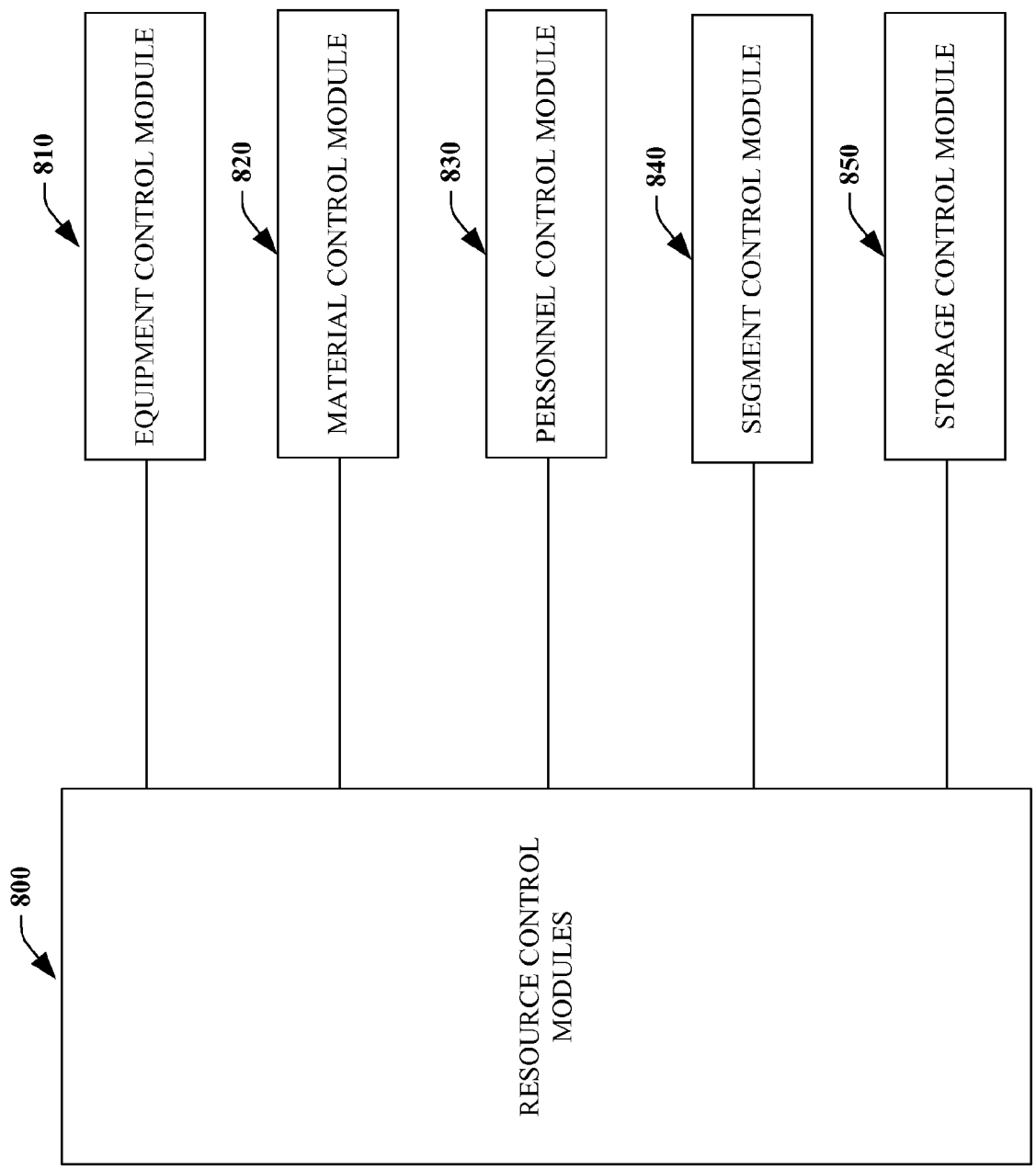
FIG. 8 is a diagram illustrating example resource control modules.

Turning to FIG. 8, example resource control modules 800 are illustrated. In general, resource control modules 800 provide simple control of one or more resources. The resource control module (RCM) 800 represents the logic to manage the state or data of the resource and may contain other resource control modules to achieve its respective functionality. The RCM 800 provides public interfaces via actions and properties. In some cases, an action may be a simple bit value or a request value that is interfaced to internal values in the module and in other cases more complex logic can be provided. The RCM 800 can include other resource control modules and may promote a command to be represented as segment resource control interface. Example forms of the RCM 800 include:

At 810, an Equipment Control Module (Common name="Control Module") CM. The simplest form of basic regulatory control of equipment. Encapsulating the equipment and its control such as control of values, drives, and so forth. At 820, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 830, a Personnel Control Module (PCM) is provided. This includes management of individual people such as Active, Idle, Break states directly or via shift schedules. This also includes data associated with people such as shift time patterns, for example. Other attributes that may be managed by PCM 830 are a person's location in a plant (GPS), qualification checks, or current assignment, for example. At 840, a Segment Control Module (SCM) includes manipulation of simple segment tasks such as piping paths, AGV paths, device state machines, robotic sequences and so forth. The SCM 840 typically performs an action on one segment such as next step to execute after the current step. At 850, a Storage Control Module (STGCM) includes Manipulation of simple storage logic such as buffer capacity and ordering into and out of a queue for the respective storage unit or requirement.

Figure 9:
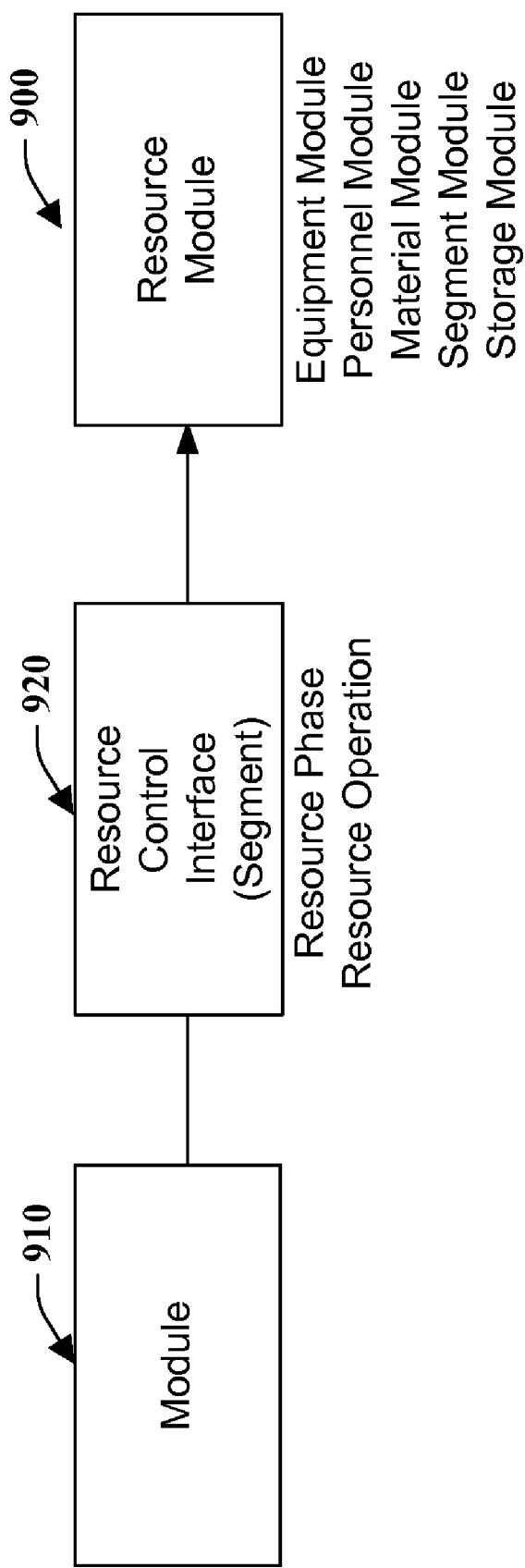
FIG. 9 is a diagram illustrating a resource module.

FIG. 9 illustrates a resource module 900 for an industrial control system. Resource modules 900 extend resource control modules described above to enable coordination of resources (equipment, people, modules and so forth) to achieve. As shown, the resource control module 900 includes a module 910 and a resource control interface 920. Resource modules 900 are also able to represent more complex activities than resource control modules. For example, resource modules may include other resource control modules at 910 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 10:
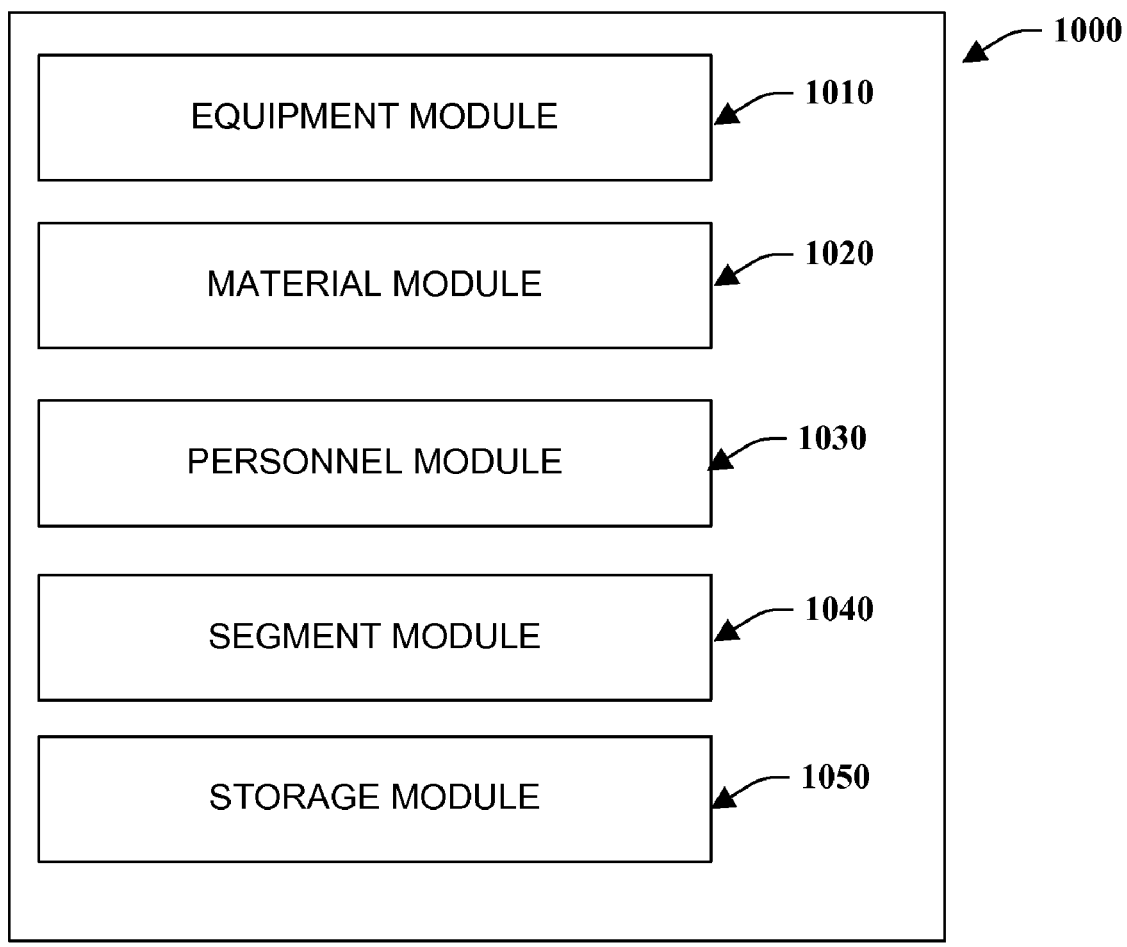
FIG. 10 is a diagram illustrating example resource modules.

FIG. 10 illustrates example resource modules 1000 for an industrial control system. At 1010, an Equipment Module provides coordination of equipment modules and equipment control modules to perform a process-orientated task independent of specific material e.g., In-feed, AGV controller, Conveyor, and so forth. At 1020, a Material Module provides coordination of material modules and material control modules to perform material focused tasks e.g., Material reservation, provision, material mass balance calculation, Bill of Material management, Work order management, and so forth. At 1030, a Personnel Module provides coordination of personnel modules and personnel control modules to perform personnel focused tasks e.g., Electronic signature collection, Security validation, certification validation, Manual control interactions, and so forth.

At 1040, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1040 may also construct a sequence to be followed that can be applied as manual, automatic or semi automatic sequences (e.g., Route, recipe execution) At 1050, a Storage Module provides coordination of storage related activities, allocation of storage to requestors, modeling of inventory calculations and so forth. This also includes interaction with higher-level systems that manage storage and inventory information.

Figure 11:
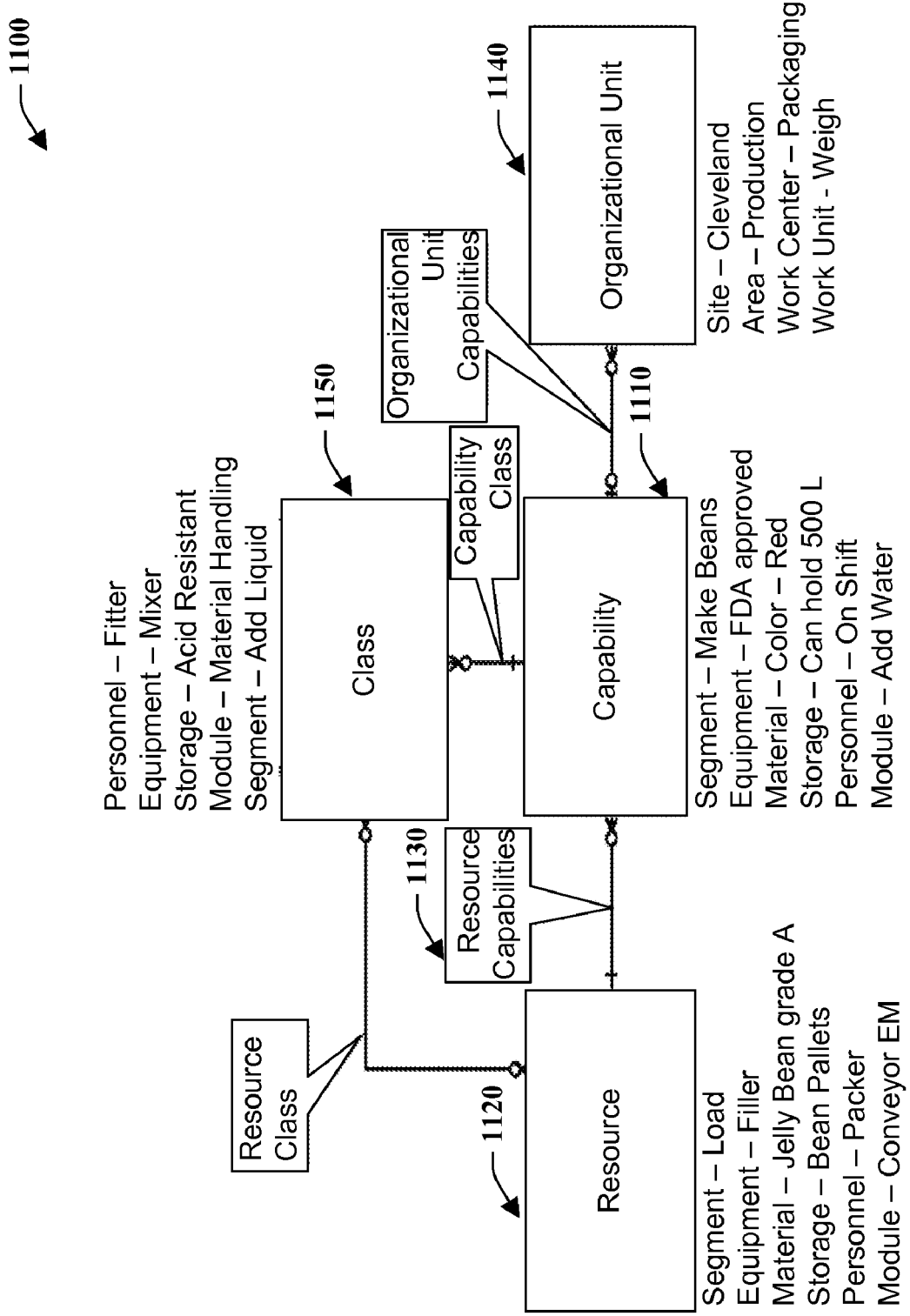
FIG. 11 is a diagram illustrating a resource control model.

FIG. 11 illustrates an example resource control model 1100 for an industrial control system. Resource Control Interfaces are the interfaces exposed to production management systems for resource binding and arbitration purposes. The interfaces are elements of the resource control model 1100 including procedures, operations or phases. These interfaces are made available by exposure via one or more capabilities 1110 described below. Procedures, operations and phases depicted in this model 1100 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1120 such as material, equipment, personnel are considered during the binding process of product production rules to work centers (production lines, process cells, and so forth). These selection processes evaluate resource capabilities to locate the appropriate resource for the task.

Resource capabilities 1110 include the resource 1120 required to perform work in a production system. Consequently, resources 1120 are at the centre of, efficiency, capacity, scheduling and arbitration considerations. A resource's ability to work or be available to allow work to commence is represented as resource capability at 1130. The existence of capability 1130 associated with a resource 1120 does not make the resource available for production; the resource's capability 1130 is associated with organizational units 1140 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1130 in the scope of organizational units 1140 they are to be executed within.

Resources 1120 publish capabilities to organizational units 1140 for use by system processes in a given scope. Modules are a type of resource and can be accessed directly by published capabilities 1110. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1110. Resource modules provide the ability to promote a command to become a resource control interface.

Some control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1100, the resource 1120 and capability can be associated with a higher-level class or abstraction 1150.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate state processing in an industrial control environment, comprising:
 a unit module to process a present state of at least one unit in an industrial control facility, wherein the unit module at least one of sends commands or receives status information from the at least one unit;
 a status component associated with the unit module to receive and process status information to determine at least one predefined present state for the at least one unit; and
 a communication component associated with the unit module to output the at least one pre-defined present state of the at least one unit to at least one of a controller or a subordinate module.

2. The system of claim 1, wherein the subordinate module includes one or more equipment modules or control modules.

3. The system of claim 1, wherein the unit module performs continuous process or discrete control applications.

4. The system of claim 1, wherein the at least one unit is at least one of a vessel, a tank, a work area, or an assembly point.

5. The system of claim 1, wherein the present state relates to an Availability Status and the at least one predefined present state includes Available, Producing, Held, or Out of Service.

6. The system of claim 5, wherein the Availability Status is extensible.

7. The system of claim 5, wherein the unit module accepts requests from users or external logic to change the availability state.

8. The system of claim 1, wherein the present state relates to a Cleanliness Status and the at least one predefined present state includes Not Clean, Rinsed, Cleanliness, or Sanitized.

9. The system of claim 8, wherein the Cleanliness Status is extensible.

10. The system of claim 8, wherein the unit module accepts requests from users or external logic to change the cleanliness state.

11. The system of claim 1, wherein the present state relates to a Process Status and the at least one predefined present state includes Empty, Filling, Processing, or Emptying.

12. The system of claim 11, wherein the Processing Status is extensible.

13. The system of claim 11, wherein the unit module accepts requests from users or external logic to change the processing state.

14. The system of claim 1, wherein the present state relates to an Alarm Status, a Quality Status, an Overall Equipment Efficiency ("OEE") or a Campaign Status.

15. The system of claim 14, wherein the Alarm status, Quality status, OEE status and Campaign status are extensible.

16. The system of claim 15, wherein the unit module is associated with an S88 state model.

17. The system of claim 14, wherein the unit module accepts requests from users or external logic to change the Alarm status, Quality status, OEE status, or Campaign status.

18. The system of claim 1, wherein the unit module processes performance data that is associated with equipment availability, performance rate, or quality.

19. The system of claim 18, wherein the performance data may include Last Batch Cycle Time, Average Batch Cycle Time, Time Held, Time Standby, Number of Times Held Current Batch, Number of Times Aborted Current Batch, Number of Faults Current Batch, or Number of Faults Last Batch, or Unit Use Count.

20. The system of claim 18, wherein the performance data is extensible.

21. The system of claim 18, wherein the unit module accepts requests from users or external logic to change the performance status.

22. The system of claim 1, wherein the unit module monitors current batch cycle times and compares the times to a configured batch cycle time limit.

23. The system of claim 1, wherein the unit module provides campaign data that may include a Campaign Count Preset, a Campaign Count Actual, a Last Batch indicator, and a First Batch indicator.

24. The system of claim 1, wherein the unit module processes quality status that may include Testing, Released, Held, Failed, or Test Batch.

25. The system of claim 1, wherein the unit module may include a command data structure, a state data structure, a mode control structure, an interlock structure, a simulation control, or a configuration data structure, a permissive data structure, a fault data structure, an input data structure and an output data structure.

26. A method to use status processing in an industrial control process, comprising:
defining one or more present state conditions for a unit;
reading the present state conditions within a unit module;
analyzing the present state conditions; and
synchronizing other control processes in view of the present state conditions.

27. The method of claim 26, wherein the present state conditions relate to an Availability Status and the defined states include Available, Producing, Held, or Out of Service.

28. The method of claim 26, wherein the present state conditions relate to a Cleanliness Status and the defined states include Not Clean, Rinsed, Cleaned, or Sanitized.

29. The method of claim 26, wherein the present state conditions relate to a Process Status and the defined states include Empty, Filling, Processing, or Emptying.

30. The method of claim 26, wherein the present state conditions relate to at least one of an Alarm status, a Quality Status, or a Campaign Status.

31. The method of claim 26, further comprising processing performance data that is associated with equipment availability, performance rate, or quality.

32. The system of claim 31, wherein the performance data includes Last Batch Cycle Time, Average Batch Cycle Time, Time Held, Time Standby, Number of Times Held Current Batch, Number of Times Aborted Current Batch, Number of Faults Current Batch, Number of Faults Last Batch, or Unit Use Count.

33. The system of claim 26, further comprising processing at least one extensible state.

34. A unit module control system, comprising:
means for controlling a unit module;
means for generating status for the unit module; and
means for analyzing the status within the unit module where the status is employed to determine present conditions of at least one unit.

35. A system that facilitates state processing in an industrial control environment, comprising:
a processor
a memory communicatively coupled to the processor, the memory having stored therein computer-executable instructions configured to implement the state processing system including:
a unit module component to analyze one or more predefined present conditions of a unit;
a status component to store the present conditions of the unit; and
a control component to initiate future actions based upon the present conditions of the unit.

36. The system of claim 35, wherein the present conditions of a unit includes at least one of a Cleanliness status, an Availability status, a Quality Status, an alarm Status, or a Process status.

* * * * *